(12) United States Patent
Kim

(10) Patent No.: US 11,536,565 B2
(45) Date of Patent: Dec. 27, 2022

(54) SYSTEM AND METHOD FOR GIMBAL LOCK AVOIDANCE IN AN AIRCRAFT

(71) Applicant: BELL TEXTRON INC., Fort Worth, TX (US)

(72) Inventor: Sung Kyun Kim, Bedford, TX (US)

(73) Assignee: TEXTRON INNOVATIONS INC., Providence, RI (US)

( * ) Notice: Subject to any disclaimer, the term of this patent is extended or adjusted under 35 U.S.C. 154(b) by 795 days.

(21) Appl. No.: 16/448,772

(22) Filed: Jun. 21, 2019

(65) Prior Publication Data

US 2020/0400430 A1 Dec. 24, 2020

(51) Int. Cl.
*G01C 9/00* (2006.01)
*B64C 29/02* (2006.01)
*B64D 47/00* (2006.01)
*G01C 23/00* (2006.01)
*B64C 39/02* (2006.01)

(52) U.S. Cl.
CPC .............. *G01C 9/005* (2013.01); *B64C 29/02* (2013.01); *B64D 47/00* (2013.01); *G01C 23/005* (2013.01); *B64C 39/024* (2013.01); *B64C 2201/02* (2013.01); *B64C 2201/145* (2013.01); *B64C 2201/146* (2013.01)

(58) Field of Classification Search
CPC ...................................................... G01C 9/005
See application file for complete search history.

(56) References Cited

U.S. PATENT DOCUMENTS

| 9,199,726 | B2 * | 12/2015 | Sankrithi | G05D 1/0066 |
| 9,518,821 | B2 * | 12/2016 | Malay | G01C 9/005 |
| 9,676,479 | B2 * | 6/2017 | Brody | B64C 9/00 |
| 10,566,647 | B2 * | 2/2020 | Andryukov | H01M 10/48 |
| 2014/0291453 | A1 * | 10/2014 | Sankrithi | G05D 1/0066 244/199.4 |
| 2014/0297067 | A1 * | 10/2014 | Malay | G08C 17/02 701/4 |
| 2017/0272842 | A1 | 9/2017 | Touma et al. | |
| 2017/0313410 | A1 | 11/2017 | Ismagilov et al. | |
| 2018/0127094 | A1 * | 5/2018 | Zapata | G05D 1/0858 |
| 2018/0139518 | A1 | 5/2018 | Touma et al. | |

(Continued)

FOREIGN PATENT DOCUMENTS

JP 2007508998 * 4/2007

OTHER PUBLICATIONS

Selig, Michael S., Real-Time Flight Simulation of Highly Maneuverable Unmanned Aerial Vehicles, Journal of Aircraft, vol. 51, No. 6, Nov. 2014, University of Illinois at Urbana-Champaign, Urbana, Illinois 61801 (https://m-selig.ae.illinois.edu/pubs/Selig-2014-JofAC-FlightSim-FINAL.pdf).*

(Continued)

*Primary Examiner* — Jean Paul Cass
(74) *Attorney, Agent, or Firm* — Akona IP PC

(57) ABSTRACT

A rotorcraft is described and includes an inertial measurement unit ("IMU") sensor mounted to the rotorcraft, the IMU sensor oriented relative to the rotorcraft such that a roll attitude of the rotorcraft occurs about a Z-axis and has a range of ±90 degrees, a pitch attitude of the rotorcraft occurs about an X-axis and has a range of ±180 degrees, and a yaw attitude of the rotorcraft occurs about a Y-axis and has a range of ±180 degrees.

10 Claims, 8 Drawing Sheets

(56) References Cited

U.S. PATENT DOCUMENTS

2018/0280817 A1 10/2018 Suttell
2019/0382104 A1* 12/2019 Low ..................... B64C 39/024

OTHER PUBLICATIONS

Google translation of Japanese Patent Pub. No. JP2007508998A.*
Heddinger, Jean-Paul, "Performance and Control Scalability of a Quadrotor Biplane Tailsitter," AIAA Scitech 201S Forum, 13 pages.
Wikipedia, "Gimbal lock" retrieved on Apr. 24, 2019 from https://en.wikipedia.org/w/index.php?title=Gimbal_lock&oldid=893879734, 4 pages.

* cited by examiner

SYSTEM AND METHOD FOR GIMBAL LOCK AVOIDANCE IN AN AIRCRAFT

TECHNICAL FIELD

This disclosure relates in general to the field of aircraft and, more particularly, though not exclusively, to systems and method for avoiding gimbal lock in such aircraft.

BACKGROUND

Unlike fixed-wing aircraft, vertical takeoff and landing ("VTOL") aircraft do not require runways. Instead, VTOL aircraft are capable of taking off, hovering, and landing vertically. One example of VTOL aircraft is a helicopter, which is a rotorcraft having one or more rotors that provide vertical lift and forward thrust to the aircraft. Helicopter rotors not only enable hovering and vertical takeoff and vertical landing, but also enable forward, aftward, and lateral flight. These attributes make helicopters highly versatile for use in congested, isolated or remote areas where fixed-wing aircraft may be unable to take off and land. Helicopters, however, typically lack the forward airspeed of fixed-wing aircraft.

A tiltrotor is another example of a VTOL aircraft. Tiltrotor aircraft utilize tiltable rotor systems that may be transitioned between a forward thrust orientation and a vertical lift orientation. The rotor systems are tiltable relative to one or more fixed wings such that the vertical lift orientation is used for vertical takeoff, hovering, and vertical landing and the forward thrust rotation is used for forward flight, or airplane mode, in which the fixed wing or wings provide lift. In this manner, tiltrotor aircraft combine the vertical lift capability of a helicopter with the speed and range of fixed-wing aircraft.

VTOL aircraft may be manned or unmanned. An unmanned aerial vehicle ("UAV"), also commonly referred to as a "drone," is an aircraft without a human pilot aboard. UAVs may be used to perform a variety of tasks, including filming, package delivery, surveillance, and other applications. A UAV typically forms a part of an unmanned aircraft system ("UAS") that includes the UAV, a ground-based, or remote, controller, and a system of communication between the vehicle and controller.

SUMMARY

A rotorcraft is described and includes an inertial measurement unit ("IMU") sensor mounted to the rotorcraft, the IMU sensor oriented relative to the rotorcraft such that a roll attitude of the rotorcraft occurs about a Z-axis and has a range of ±90 degrees, a pitch attitude of the rotorcraft occurs about an X-axis and has a range of ±180 degrees, and a yaw attitude of the rotorcraft occurs about a Y-axis and has a range of ±180 degrees.

BRIEF DESCRIPTION OF THE DRAWINGS

To provide a more complete understanding of the present disclosure and features and advantages thereof, reference is made to the following description, taken in conjunction with the accompanying figures, in which like reference numerals represent like elements.

DETAILED DESCRIPTION

Figure 1A:
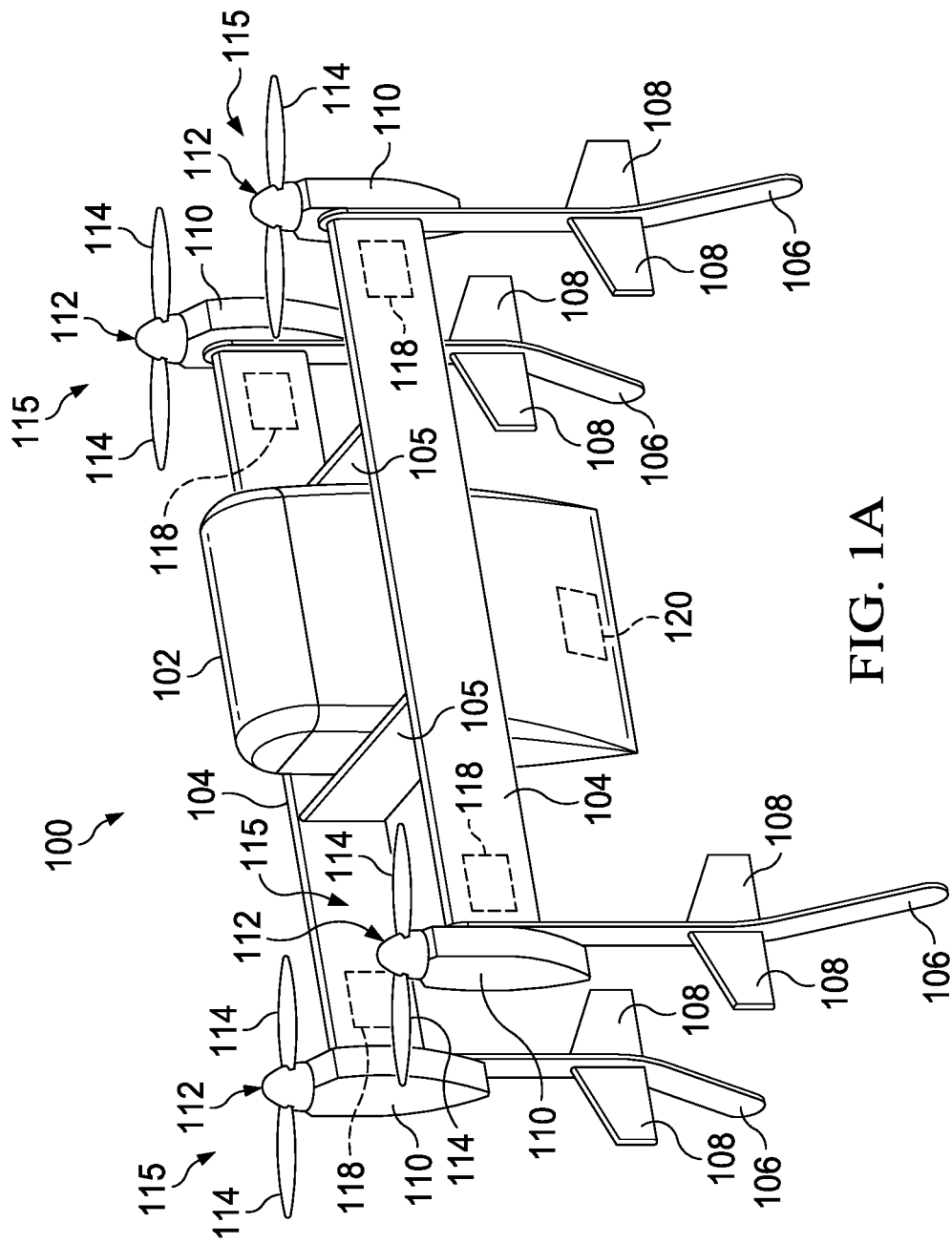
FIGS. 1A-1B are simplified diagrams of an example UAV, in accordance with certain embodiments.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

Additionally, as referred to herein in this Specification, the terms "forward", "aft", "inboard", and "outboard" may be used to describe relative relationship(s) between components and/or spatial orientation of aspect(s) of a component or components. The term "forward" may refer to a spatial direction that is closer to a front of an aircraft relative to another component or component aspect(s). The term "aft" may refer to a spatial direction that is closer to a rear of an aircraft relative to another component or component aspect(s). The term "inboard" may refer to a location of a component that is within the fuselage of an aircraft and/or a spatial direction that is closer to or along a centerline of the aircraft (wherein the centerline runs between the front and the rear of the aircraft) or other point of reference relative to another component or component aspect. The term "outboard" may refer to a location of a component that is outside the fuselage of an aircraft and/or a spatial direction that is farther from the centerline of the aircraft or other point of reference relative to another component or component aspect.

Further, the present disclosure may repeat reference numerals and/or letters in the various examples. This repetition is for the purpose of simplicity and clarity and does not in itself dictate a relationship between the various embodiments and/or configurations discussed. Example embodiments that may be used to implement the features and functionality of this disclosure will now be described with more particular reference to the accompanying FIGURES.

Figure 1B:
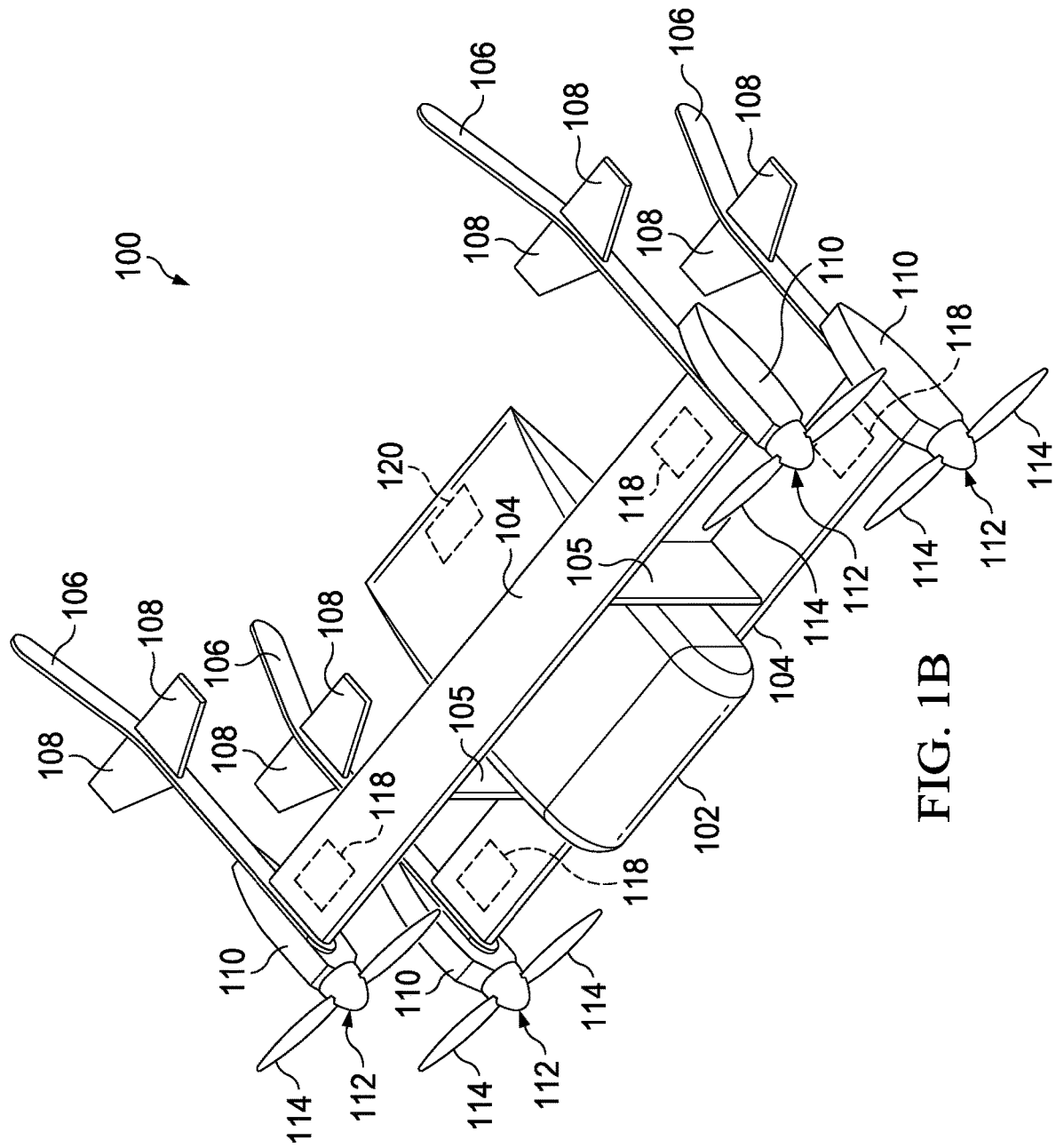

Referring now to FIGS. 1A-1B, FIGS. 1A-1B illustrate example embodiments of an example aircraft 100, which in these examples is generally configured as a vertical takeoff and landing ("VTOL") aircraft. More specifically, aircraft 100 may be an autonomous pod transport ("APT") convertible drone-type aircraft (discussed in further detail below) that is operable in different flight modes including a helicopter mode (as shown in FIG. 1A) and an airplane mode (as shown in FIG. 1B). In helicopter mode, aircraft 100 may be capable of various flight maneuvers including, but not limited to, vertical takeoff from and landing to one or more landing zone(s), hover, and/or sideward and rearward mobility or flight. In airplane mode, aircraft 100 may be capable of forward flight maneuvers. Additionally, since aircraft 100 is a convertible aircraft, it is also operable in a conversion, or transition, mode when transitioning between the helicopter and airplane modes.

As previously noted, unlike fixed-wing aircraft, VTOL aircraft do not require runways. Instead, VTOL aircraft are capable of taking off, hovering, and landing vertically. As also noted above, helicopters and tiltrotors are examples of VTOL aircraft. Yet another type of VTOL aircraft is commonly referred to as a "tail-sitter" aircraft. As the name implies, a tail-sitter aircraft takes off and lands on its tail, but tilts horizontally for forward flight. As illustrated in the embodiments of FIGS. 1A-1B, aircraft 100 is configured as a tail-sitter aircraft. Being a drone-type aircraft, aircraft 100 is configured for remote control and operation. Additionally, at least in some embodiments, aircraft 100 may be fully autonomous and self-directed via a predetermined or preprogrammed location-based guidance system (e.g., global positioning system ("GPS"), coordinate-based location, street address, etc.). Additionally, aircraft 100 may be a manned aircraft.

In at least one embodiment, aircraft 100 may include a cargo pod 102 that functions as the fuselage, wings 104, vertical supports 105 disposed between the wings 104, tail booms 106, horizontal stabilizers 108 extending from each tail boom 106, and a plurality of pylons 110 each comprising a rotor system 112 having a plurality of rotor blades 114. Each combination of a pylon 110 and its associated rotor system 112 comprising rotor blades 114 may be referred to herein as a propulsion assembly 115. Aircraft 100 may also include plurality of aircraft sensors 118 and a control system 120. Wings 104 comprise a substantially parallel, double-wing (sometimes referred to as "biplane") configuration that provides lift to the aircraft 100 during forward flight (e.g., as shown in FIG. 1B) while also maintaining a smaller footprint of the aircraft 100 when the aircraft 100 is on the ground. Vertical supports 105 are disposed on each side of the cargo pod 102 and affixed between the wings 104 to provide structure and support to the wings 104. The cargo pod 102 is generally positioned between the wings 104 and the vertical supports 105. In the embodiment shown, the cargo pod 102 is affixed to the vertical supports 105. However, in other embodiments, the cargo pod 102 may be affixed to the wings 104 or both the wings 104 and vertical supports 105. Additionally, while two vertical supports 105 are shown, in some embodiments, aircraft 100 may comprise more vertical supports 105 depending on the configuration of the aircraft 100.

Tail booms 106 are disposed on the outboard ends of each wing 104. The tail booms 106 are curved at the aft ends to provide stabilization to the aircraft 100 during forward flight in a manner substantially similar as other tail surfaces known in the art, while also doubling as a landing gear for the aircraft 100. As such the curved ends of the tail booms 106 may provide a wider base for landing gear uses. Each tail boom 106 also comprises a pair of horizontal stabilizers 108 coupled to each of an inner and outer surface of the tail boom 106. The horizontal stabilizers 108 function to provide stabilization to the aircraft 100 during forward flight in a manner substantially similar as horizontal stabilizers known in the art. Pylons 110 are disposed on outboard sides of each tail boom 106 proximate the outboard end of each wing 104. Each pylon 110 comprises a selectively rotatable rotor system 112 having a plurality of rotor blades 114 coupled thereto. In the embodiment shown, each rotor system 112 is driven by an associated electric motor (not shown) within each pylon 110. However, in other embodiments, the rotor systems 112 may be driven by a combustion engines or auxiliary power unit through a plurality of interconnect driveshafts and/or auxiliary gearboxes, which may be housed within any portion of an aircraft (e.g., within a pylon, fuselage, combinations thereof, or the like). Furthermore, since aircraft 100 functions as a convertible aircraft, the rotational speeds of each rotor system 112 may be selectively controlled to orient aircraft 100 in the various flight modes.

In various embodiments, control system 120 may include one or more processor(s), memory element(s), network connectivity device(s), storage, input/output (I/O) device(s), combinations thereof, or the like to facilitate operations of each propulsion assembly 115 and/or other electronic systems of aircraft 100. In various embodiments, operation of each propulsion assembly 115 may include controlling the rotational speed of rotor systems 112, adjusting thrust vectors of rotor systems 112, and the like to facilitate vertical lift operations, forward thrust operations, transition operations, combinations thereof, or the like for aircraft 100. In some embodiments, feedback may be received by control system 120 (e.g., via each propulsion assembly 115, one or more sensors 118, etc.) to facilitate or augment various operations of aircraft 100. In various embodiments, sensors 118 may include, but not be limited to, positioning sensors, attitude sensors, speed sensors, environmental sensors, fuel sensors, temperature sensors, location sensors, combinations thereof, or the like.

When aircraft 100 is in a helicopter mode position, rotor systems 112 may provide a vertical lifting thrust for aircraft 100, which may enable hover flight operations to be performed by aircraft 100. When aircraft 100 is in an airplane mode position, rotor systems 112 may provide ±a forward thrust and a lifting force may be supplied by wings 104.

Using Euler attitude definition for aircraft requiring large range of attitude changes may result in a phenomenon referred to as "gimbal lock" being encountered when pitch attitude approaches or exceeds approximately 90 degrees. In particular, for tail-sitter VTOL aircraft, pitch attitude must cover from nose-up attitude in hover mode to nose-forward airplane mode, which typically ranges beyond 90 degrees. One solution to this issue is to use a quaternion coordinate system. While this certainly addresses the gimbal lock problem, solutions based on a quaternion coordinate system is far more complicated and less intuitive to implement than solutions based on the standard three-dimensional coordinate frame.

In accordance with features of embodiments described herein, an inertial measurement unit ("IMU") sensor is oriented, or defined, relative to an aircraft such that the pitch attitude of the aircraft may have a range of ±180 degrees and the roll attitude may have a range of ±90 degrees.

Figure 2:
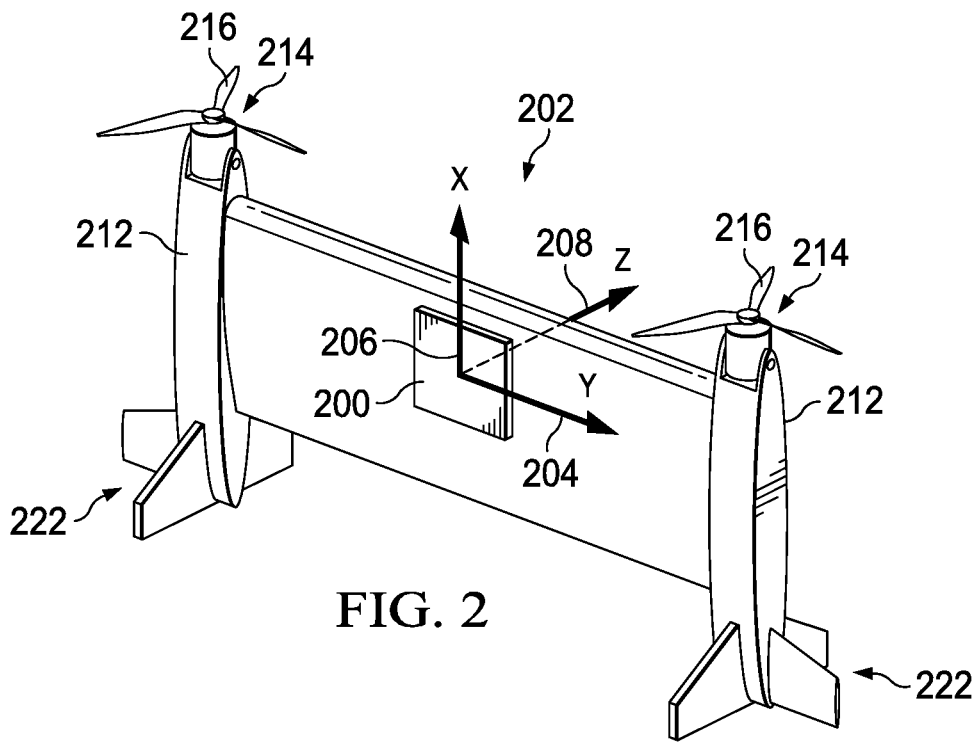
FIG. 2 is a perspective drawing of a tail sitter aircraft having an inertial measurement unit ("IMU") installed thereon in a conventional fashion.

Referring now to FIG. 2, in some embodiments, an IMU sensor 200 may be mounted to an aircraft 202. An IMU is an electronic device that measures and reports the specific force, angular rate, and/or magnetic field surrounding a body using a combination of accelerometers, gyroscopes, and/or magnetometers. IMUs are often used to maneuver aircraft, such as UAVs. In conventional embodiments, the IMU is mounted (or defined) relative to the aircraft 202 such that a pitch attitude of the aircraft occurs about the Y-axis 204 and has a range of ±90 degrees, a roll attitude of the aircraft occurs about the Z-axis 208 and has a range of ±180 degrees, and a yaw attitude of the aircraft occurs about the X-axis 206 and also has a range of ±180 degrees. When the aircraft 202 is in a pitch-up (i.e., +90 degree) orientation, as shown in FIG. 2, a gimbal lock condition occurs, resulting in ambiguous roll and yaw attitude definitions. It will be recognized that, particularly in cases of tail sitter aircraft, the aircraft will regularly need to be maneuvered in a pitch-up orientation (e.g., for take off and landing) and will therefore often be at risk in being in a gimbal-lock condition.

As illustrated in FIG. 2, aircraft 202 is a tail sitter aircraft that includes a fuselage 210 that also functions as a wing. Attached to opposite ends of the fuselage are pylons 212 each comprising a rotor system 214 including a plurality of rotor blades 216. Each combination of a pylon 212 and its associated rotor system 214 comprising rotor blades 216 may be referred to herein as a propulsion assembly. The end of each pylon 212 opposite the respective rotor system 214 functions as a tail boom 222.

Figure 3:
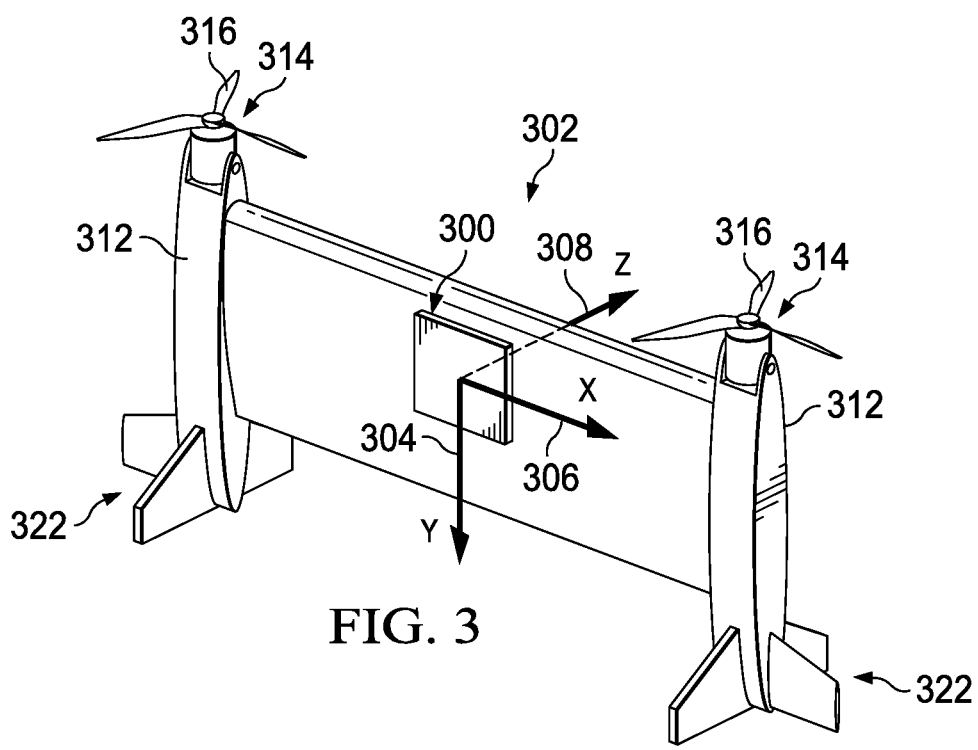
FIG. 3 is a perspective drawing of a tilt rotor aircraft having an IMU installed thereon in accordance with features of embodiments described herein.
Figure 4A:
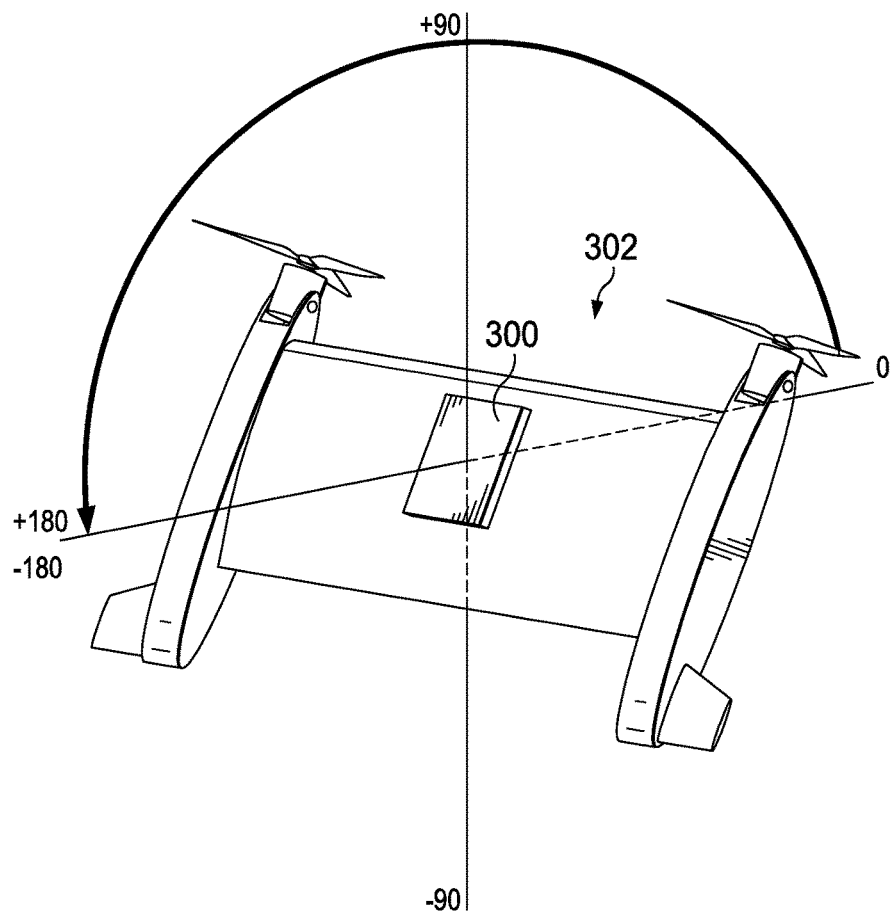
FIGS. 4A and 4B illustrate pitch and roll attitudes, respectively, of the aircraft of FIG. 3.
Figure 4B:
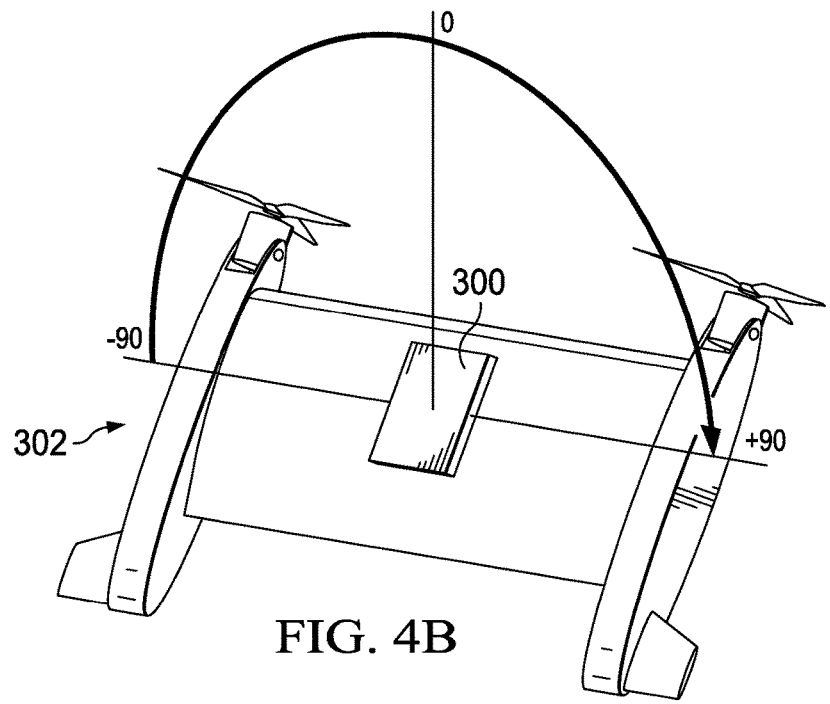

As will be described in greater detail hereinbelow, in certain embodiments, pitch and roll attitudes are redefined so as to avoid the aforementioned gimbal lock condition with respect to a VTOL aircraft. Referring now to FIG. 3, an IMU 300 may be mounted/defined relative to an aircraft 302 such that the pitch and roll attitude definitions are reversed relative to the conventional mounting/definition. In particular, as shown in FIG. 3, a roll (as opposed to pitch) attitude of the aircraft occurs about the Z-axis 308 and has a range of ±90 degrees (as shown in FIG. 4B), a pitch (as opposed to roll) attitude of the aircraft occurs about the X-axis 306 and has a range of ±180 degrees (as shown in FIG. 4A), and a yaw attitude of the aircraft occurs about the Y-axis 304 and also has a range of ±180 degrees.

As illustrated in FIG. 3, aircraft 302 is a tail sitter aircraft that includes a fuselage 310 that also functions as a wing. Attached to opposite ends of the fuselage are pylons 312 each comprising a rotor system 314 including a plurality of rotor blades 316. Each combination of a pylon 312 and its associated rotor system 314 comprising rotor blades 316 may be referred to herein as a propulsion assembly. The end of each pylon 312 opposite the respective rotor system 314 functions as a tail boom 322. It should be noted that techniques described herein may be applied to any type of tail sitter aircraft regardless of fuselage/wing configuration.

Figure 5:
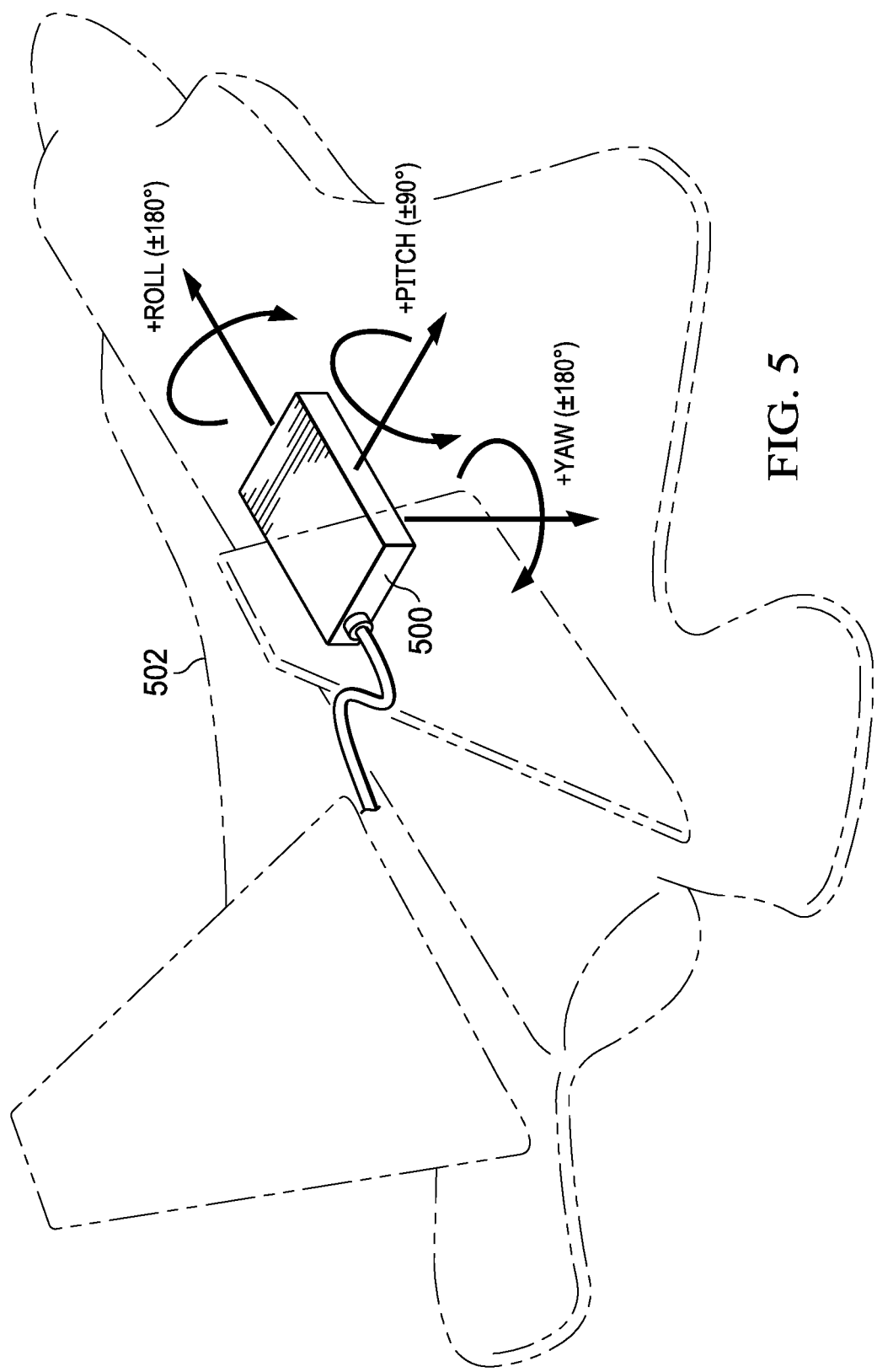
FIG. 5 illustrates a fixed wing aircraft having an IMU installed thereon in a conventional fashion.

FIG. 5 illustrates a conventional, or baseline, definition of an IMU 500 for Euler orientation angles installed in a fixed wing aircraft 502. As shown, should the aircraft 502 assume a vertical orientation (i.e., nose-up or nose down), a gimbal lock condition will occur. Although it is rare that a fixed wing aircraft 502 would need to be so oriented, the same is not true of a VTOL, which will often find itself in a nose up position (e.g., during take-off, hover, and landing).

Figure 6A:
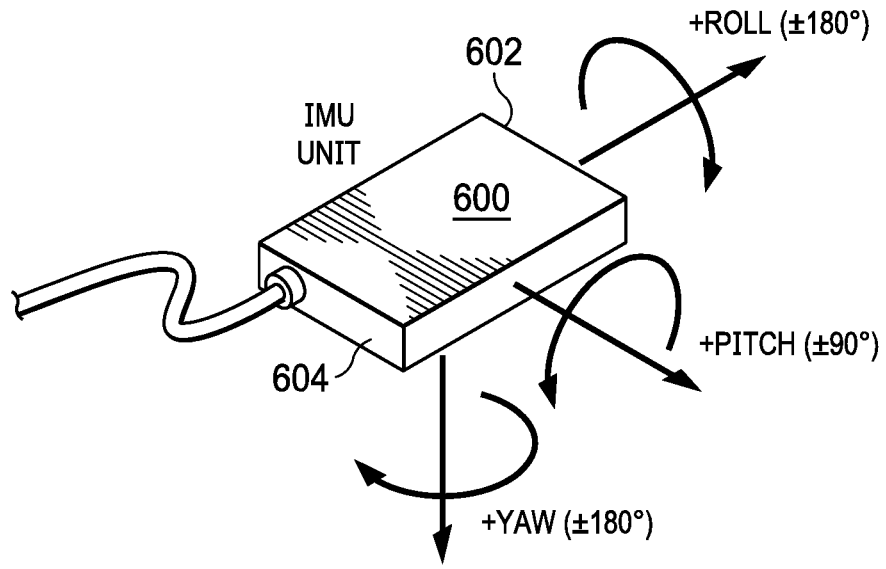
FIGS. 6A-6D illustrate a sequence of a method of defining and installing an IMU in such a manner as to avoid gimbal lock of an aircraft on which the IMU is installed.
Figure 6B:
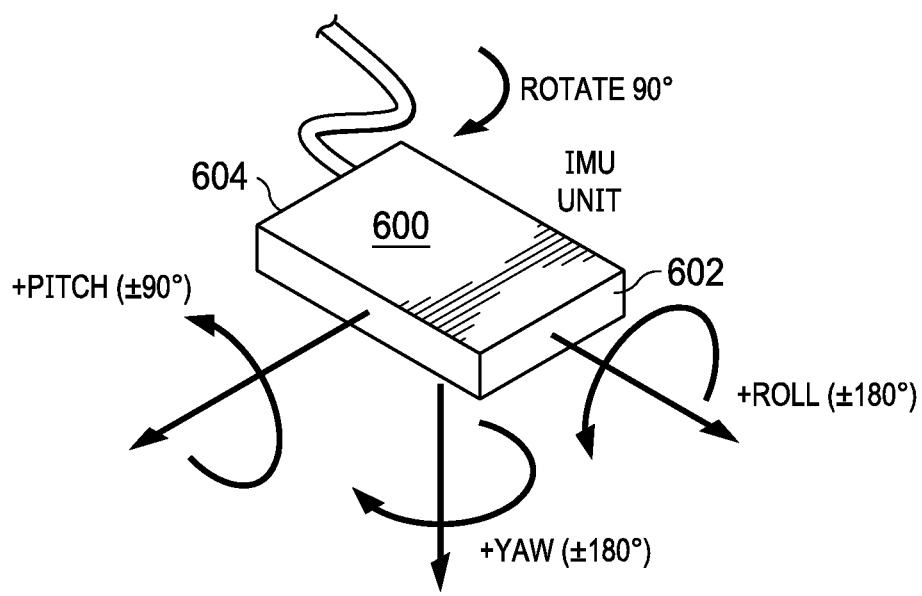

As previously noted, embodiments described herein physically reorient the IMU sensor and transform the coordinate definition to provide a ±180° pitch attitude, effectively eliminating the gimbal lock condition for the significant operational envelope. Embodiments described herein are especially useful for tail-sitter aircraft, which require a pitch attitude at or near +90° for landing, for example. FIG. 6A illustrates an IMU 600 in a conventional orientation relative to an aircraft in which a first end 602 of the IMU faces a front, or nose, of an aircraft (not shown) to which it is mounted and a second end 604 faces a rear, or tail, of the aircraft. As shown in FIG. 6B, a first step in the reorientation/transformation process is to rotate an IMU 600 90 degrees around the yaw (or Z−) axis, such that the first end 602 now faces a right side of the aircraft and the second end 604 faces the left side of the aircraft.

Figure 6C:
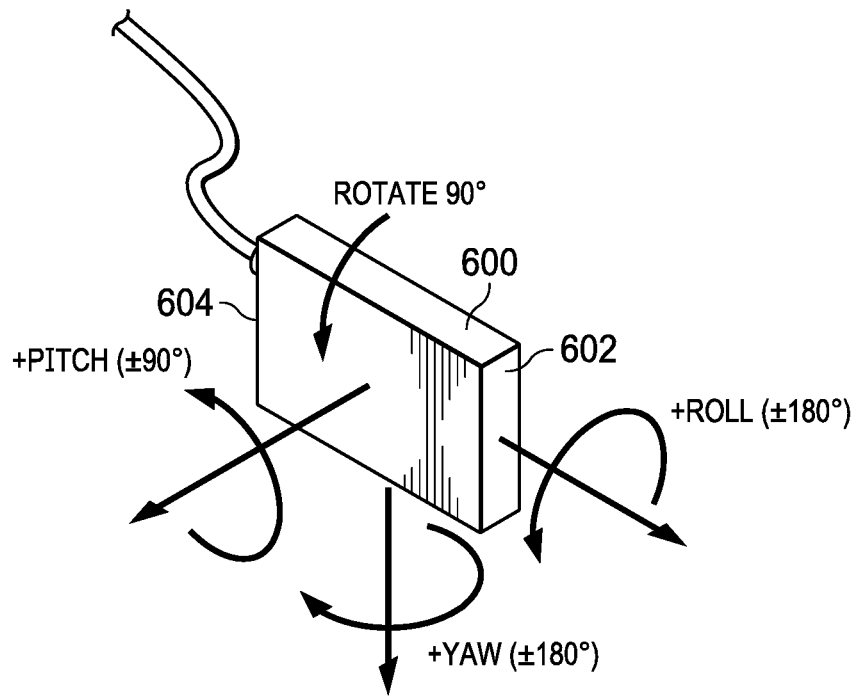

Next, as shown in FIG. 6C, the IMU 600 is rotated 90 degrees around the roll axis. Note the pitch and roll axes do not rotate with the IMU 600 due to the fact that the pitch and roll attitudes are always measured from the flat horizon as the reference zero degrees. By comparison, the rates rotate with the sensor and zero rate means whenever the sensor is not rotating with respect to the given axis, regardless of the Euler orientation.

Figure 6D:
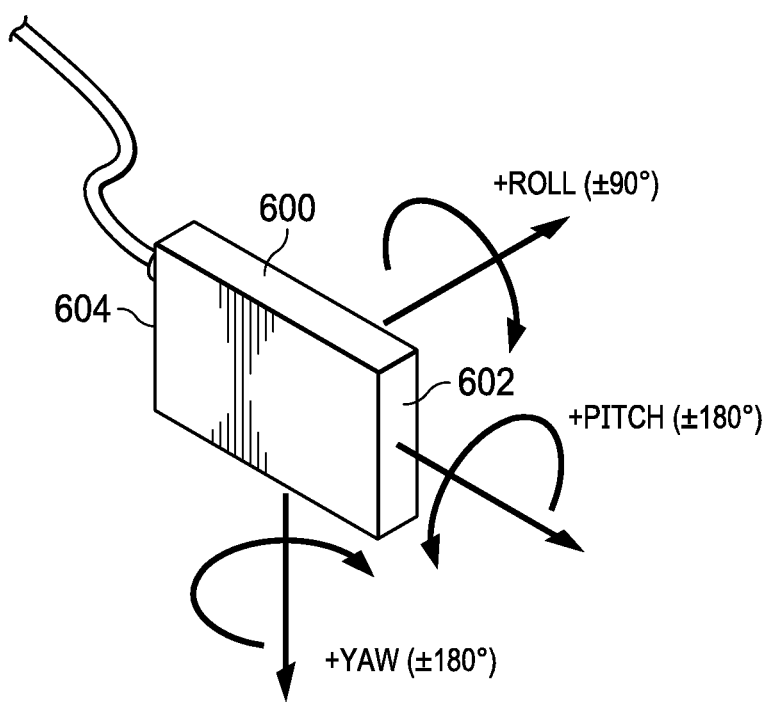

Finally, as illustrated in FIG. 6D, the attitude definition of the IMU 600 is updated as follows:
Pitch Attitude=+Roll Attitude from IMU
Roll Attitude=−Pitch Attitude from IMU
Yaw Attitude=+Yaw Attitude from IMU−90° (subtraction of 90° is to offset rotation about yaw axis described above)

Figure 7:
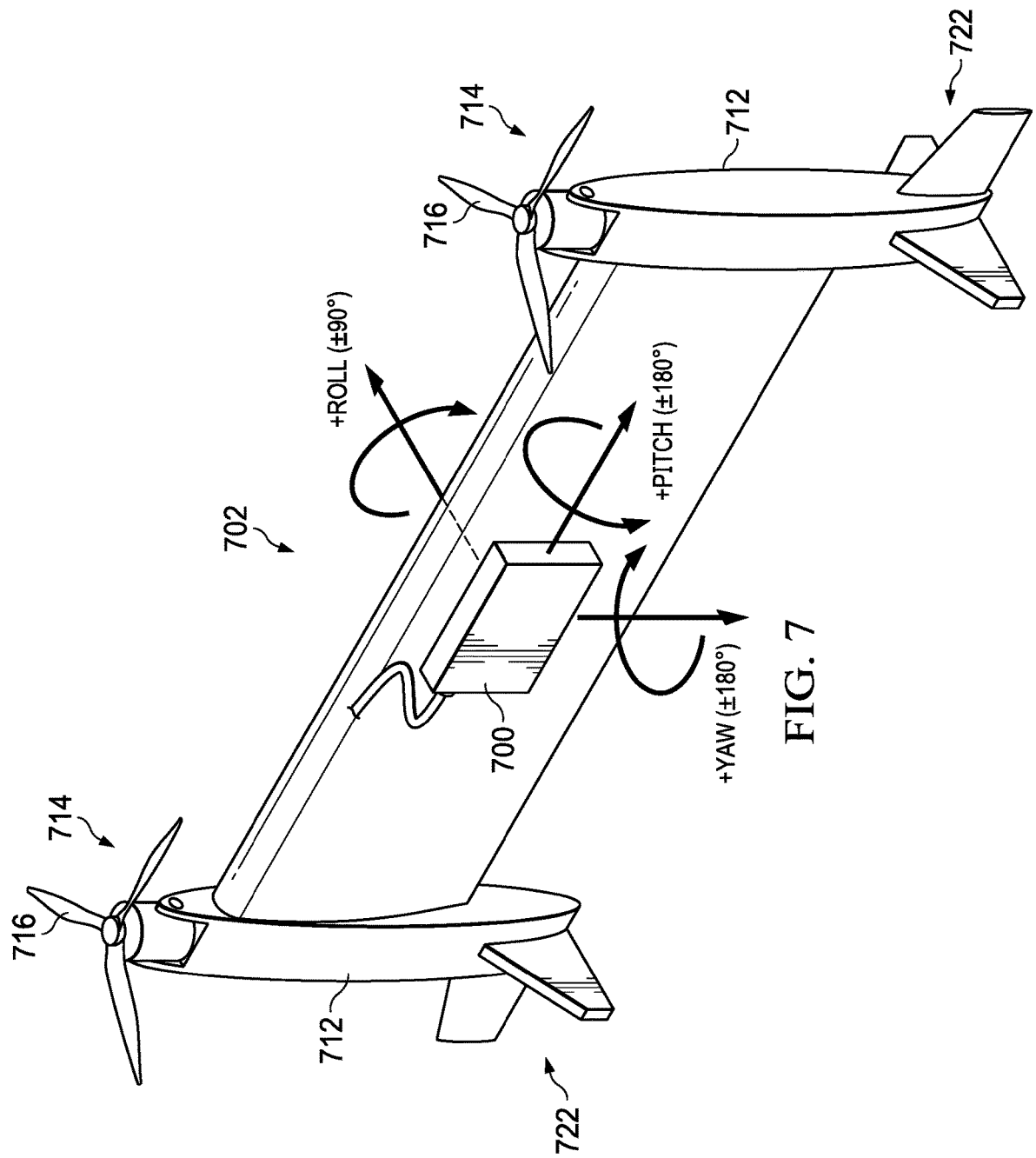
FIG. 7 illustrates a VTOL aircraft having an IMU installed thereon in accordance with the method described with reference to FIGS. 6A-6D.

A similar transformation is applied for rate definition as follows:
Pitch Rate=+Roll Rate from IMU
Roll Rate=−Pitch Rate from IMU
Yaw Rate=+Yaw Rate from IMU FIG. 7 illustrates an example implementation in which an IMU 700 having updated attitude and rate definitions as described above is installed in connection with a tail sitter aircraft 702 as also described above. At the sitting orientation shown in FIG. 7, the pitch attitude is 90°, and the roll attitude is 0°. Using the method illustrated in FIGS. 6A-6D, the pitch attitude of the aircraft 702 may have the range of ±180° (and the roll attitude will subsequently have the range of ±90°), thereby completely avoiding the pitch attitude gimbal lock problem.

It will be noted that there exists a symmetric solution providing the same effect of increased pitch attitude ranges from ±90 to ±180. At FIG. 6B, the IMU 600 may be rotated counterclockwise (or negative) 90 degrees, then at FIG. 6C, the IMU may be rotated −90 deg. In this case, the attitude transformation is:
Pitch Attitude=−Roll Attitude from IMU
Roll Attitude=+Pitch Attitude from IMU
Yaw Attitude=+Yaw Attitude from IMU+90° (addition of 90° is to offset the rotation about yaw axis described above)

The diagrams in the FIGURES illustrate the architecture, functionality, and/or operation of possible implementations of various embodiments of the present disclosure. Although several embodiments have been illustrated and described in detail, numerous other changes, substitutions, variations, alterations, and/or modifications are possible without departing from the spirit and scope of the present disclosure, as defined by the appended claims. The particular embodiments described herein are illustrative only and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

One or more advantages mentioned herein do not in any way suggest that any one of the embodiments described herein necessarily provides all the described advantages or that all the embodiments of the present disclosure necessarily provide any one of the described advantages. Note that in this Specification, references to various features included in "one embodiment", "example embodiment", "an embodiment", "another embodiment", "certain embodiments", "some embodiments", "various embodiments", "other embodiments", "alternative embodiment", and the like are intended to mean that any such features are included in one or more embodiments of the present disclosure, but may or may not necessarily be combined in the same embodiments.

As used herein, unless expressly stated to the contrary, use of the phrase "at least one of", "one or more of" and "and/or" are open ended expressions that are both conjunctive and disjunctive in operation for any combination of named elements, conditions, or activities. For example, each of the expressions "at least one of X, Y and Z", "at least one of X, Y or Z", "one or more of X, Y and Z", "one or more of X, Y or Z" and "A, B and/or C" can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms "first", "second", "third", etc., are intended to distinguish the particular nouns (e.g., blade, rotor, element, device, condition, module, activity, operation, etc.) they modify. Unless expressly stated to the contrary, the use of these terms is not intended to indicate any type of order, rank, importance, temporal sequence, or hierarchy of the modified noun. For example, "first X" and "second X" are intended to designate two X elements that are not necessarily limited by any order, rank, importance, temporal sequence, or hierarchy of the two elements. As referred to herein, "at least one of", "one or more of", and the like can be represented using the "(s)" nomenclature (e.g., one or more element(s)).

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the Specification, to limit this disclosure in any way that is not otherwise reflected in the appended claims.

What is claimed is:

1. A rotorcraft comprising:
   an integrated fuselage and wing comprising first and second ends;
   propulsion assemblies connected proximate the first and second wing ends; and
   an inertial measurement unit ("IMU") sensor mounted to the integrated wing and fuselage and defining a roll attitude, a pitch attitude, and a yaw attitude of the rotorcraft, the IMU sensor oriented relative to the rotorcraft such that a roll attitude of the rotorcraft is defined by the IMU sensor to occur about a Z-axis of the rotorcraft and has a range of ±90 degrees, a pitch attitude of the rotorcraft is defined by the IMU sensor to occur about an X-axis of the rotorcraft and has a range of ±180 degrees thereby to prevent a gimbal lock situation that occurs when the pitch attitude of the rotorcraft is outside a range of approximately ±90 degrees, and a yaw attitude of the rotorcraft is defined by the IMU sensor to occur about a Y-axis of the rotorcraft and has a range of ±180 degrees;
   wherein the Z-axis of the rotorcraft extends normal to the integrated fuselage and wing, the X-axis of the rotorcraft extends parallel to a longitudinal axis of the integrated fuselage and wing, and the Y-axis of the rotorcraft extends perpendicular to the X-axis of the rotorcraft and the Z-axis of the rotorcraft.

2. The rotorcraft of claim 1, wherein the IMU is mounted to a side of the integrated fuselage and wing.

3. The rotorcraft of claim 1, wherein each of the propulsion assemblies comprises a pylon having a rotor system disposed at a first end thereof and a tail boom disposed at a second end thereof.

4. The rotorcraft of claim 1 comprising a tail sitter aircraft.

5. A method comprising:
   mounting an inertial measurement unit ("IMU") sensor to an aircraft; and
   updating the IMU sensor by:
      setting an updated pitch attitude of the IMU sensor to a previous positive roll attitude of the IMU sensor;
      setting an updated roll attitude of the IMU sensor to a previous negative pitch attitude of the IMU sensor; and
      setting an updated yaw attitude of the IMU sensor to a previous positive yaw attitude of the IMU sensor minus 90 degrees;
   such that the updated roll attitude of the rotorcraft is defined by the IMU sensor to occur about a Z-axis of the rotorcraft and has a range of ±90 degrees, the updated pitch attitude of the rotorcraft is defined by the IMU sensor to occur about an X-axis of the rotorcraft and has a range of ±180 degrees thereby to prevent a gimbal lock situation that occurs when an actual pitch attitude of the rotorcraft is outside a range of approximately ±90 degrees, and the updated yaw attitude of the rotorcraft is defined by the IMU sensor to occur about a Y-axis of the rotorcraft and has a range of ±180 degrees.

6. The method of claim 5, wherein the updating further comprises:
   updating the IMU sensor by:
   setting an updated pitch rate of the IMU sensor to a previous positive roll rate of the IMU sensor;
   setting an updated roll rate of the IMU sensor to a previous negative pitch rate of the IMU sensor; and
   setting an updated yaw rate of the IMU sensor to a positive yaw rate of the IMU sensor.

7. The method of claim 5, wherein the aircraft comprises a tail sitter aircraft.

8. The method of claim 5, wherein the mounting comprises mounting the IMU sensor to a fuselage of the aircraft.

9. The method of claim 5, wherein the mounting comprises mounting the IMU sensor to a wing of the aircraft.

10. The method of claim 5, wherein the updating further comprises:
    updating the IMU sensor by:
    setting an updated pitch attitude of the IMU sensor to a previous negative roll attitude of the IMU sensor;
    setting an updated roll attitude of the IMU sensor to a previous positive pitch attitude of the IMU sensor; and
    setting an updated yaw attitude of the IMU sensor to a previous positive yaw attitude of the IMU sensor plus 90 degrees.

* * * * *